June 19, 1962 H. KROBATH 3,039,312
ELECTRONIC PROTRACTOR
Filed Jan. 28, 1958 3 Sheets-Sheet 1

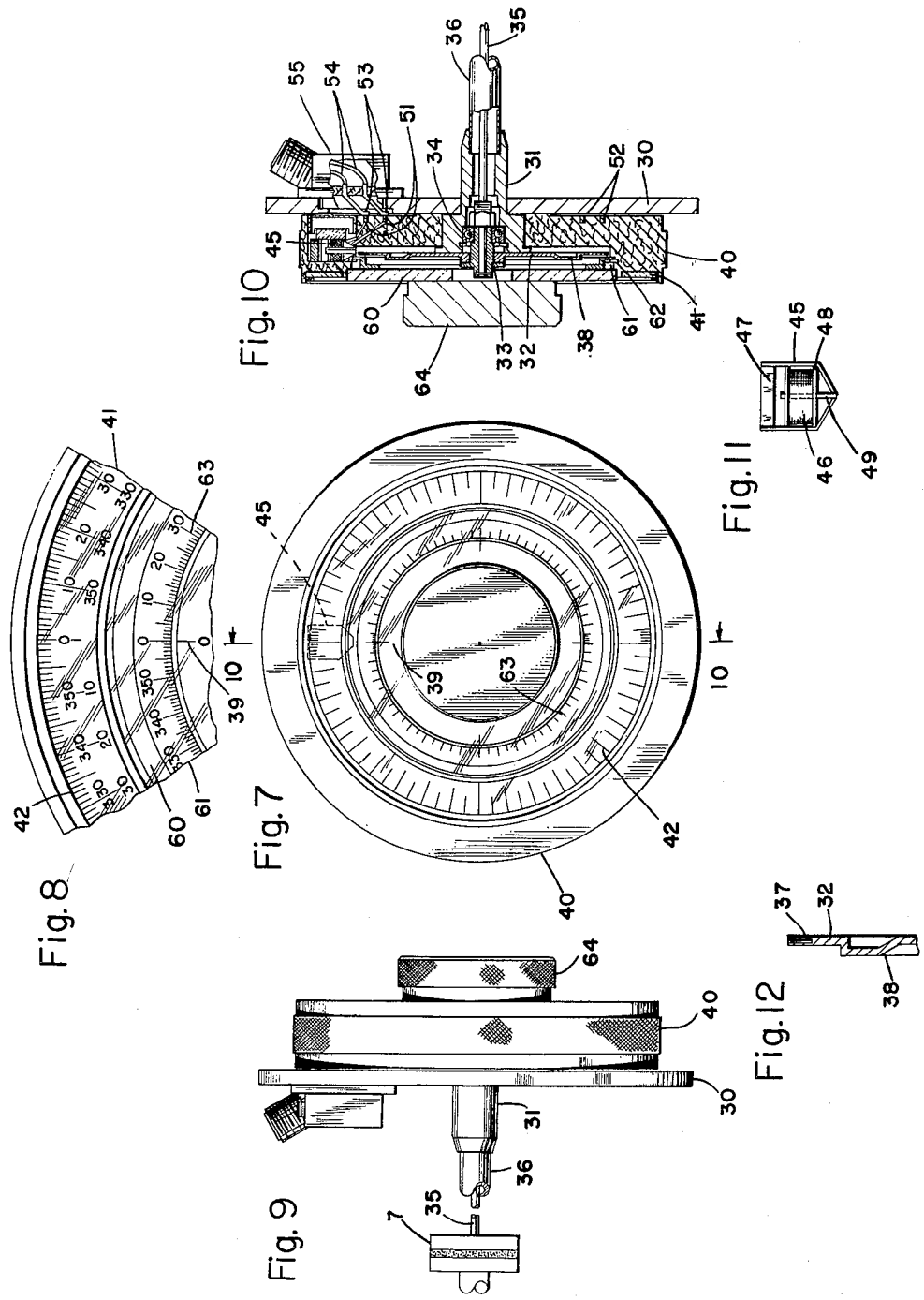

United States Patent Office 3,039,312
Patented June 19, 1962

3,039,312
ELECTRONIC PROTRACTOR
Hans Krobath, Glen Cove, N.Y., assignor to Abilities, Inc., Long Island, N.Y., a corporation of New York
Filed Jan. 28, 1958, Ser. No. 711,678
10 Claims. (Cl. 73—465)

The present invention relates to protractors and particularly to an electronic protractor to determine and locate asymmetry such as unbalance of a rotating body.

By use of appropriate sensing elements, apparatus in accordance with the invention is capable of locating accurately asymmetry of any character, for example asymmetry of mass, shape, electrical characteristics, magnetic characteristics, etc. The invention is particularly useful in locating asymmetry of weight producing an unbalance in a rotating body. Exact balancing is of primary importance in rotors of turbines, motors, gyroscopes and other equipment operating at high speed since any unbalance sets up highly objectionable and in some cases destructive vibrations. However, the balancing of high speed rotors presents a difficult problem since the location of any unbalance is preferably effected at or near the operating speed. A feature of the apparatus in accordance with the invention is that it is operable at high speeds, for example 50,000 to 100,000 revolutions per minute, and retains its accuracy even at such speeds.

With equipment heretofore available, the balancing of a rotor has been a trial and error procedure by reason of the inability of the apparatus to determine the location and magnitude of an unbalance with sufficient exactitude. After making an approximate correction it has been necessary to test the balance again and make further corrections. Usually the operation must be repeated several times before satisfactory balance is obtained. This is a time-consuming and expensive procedure. With the apparatus of the present invention it is possible to determine simultaneously both the magnitude and the location of an unbalance with such precision that complete correction can be made from a single reading. The time and cost involved in balancing a rotor are thereby greatly reduced.

The apparatus in accordance with the invention for determining the magnitude and location of asymmetry of a rotating body comprises an oscilloscope, sensing means which is responsive to asymmetry of the rotating body, a stationary indicator or pointer adjacent the rotating body, and a protractor head. The sensing means is connected with the vertical deflection circuit of the oscilloscope and to the external synchronizing circuit to produce on the screen of the oscilloscope a cure which is characteristic of the body's asymmetry and has an amplitude proportional to its magnitude. The protractor head comprises a rotating member coupled to and rotating with the body being tested and a manually rotatable but normally stationary dial. A pulse pickup on the dial and an actuating element on the rotating member cooperate to produce a pulse at a selected point in each rotation of the rotating member and hence of the body being tested. The pulse pickup is also connected to the vertical deflection circuit of the oscilloscope. Each pulse hence produces a pip on the curve appearing on the oscilloscope screen. Rotation of the dial of the protractor head changes the phase relation between the pulse from the pulse pickup and the signal from the sensing means and thereby causes the pip to move along the curve. The pip can hence be brought to a selected position on the curve by turning the dial of the protractor head.

To determine the position and magnitude of rotor unbalance, the sensing elements are connected to bearings supporting the rotor and the rotating member of the protractor head is coupled coaxially with the rotor. The rotor is then rotated at a selected speed, for example the speed at which it is to operate. With the connections described, any unbalance of the rotor produces a curve on the oscilloscope screen having an amplitude proportional to the magnitude of the unbalance. The magnitude is readily determined by a suitable scale on the oscilloscope screen. With the rotor rotating at a selected speed, the dial of the protractor is turned to bring the pip produced by the pulse pickup to a selected point on the oscilloscope curve, for example to the center of a lobe. The machine is then stopped and the rotor is turned to bring indices on the rotating member and the dial into registration. With the rotating member thus indexed, the position of the unbalance is indicated by the stationary indicator or pointer. The precision of the protractor is so great that the position of the unbalance can be located within one or two degrees. As the magnitude and position of the unbalance are thus accurately determined, it can be readily and completely corrected by adding or removing weight at the indicated point and in the indicated amount.

In a preferred form of the apparatus, the protractor head is provided with a further calibrated dial which is rotatable relative to the main dial carrying the pulse pickup. The additional dial facilitates correction for lag in the sensing elements and makes it possible to locate the indicator at a position convenient to the operator.

The nature, objects and advantages of the invention will be more fully understood from the following description and claims in conjunction with the accompanying drawings which illustrate by way of example a preferred embodiment of the invention and in which:

FIG. 7 is a front view of the protractor head of the apparatus.

FIG. 8 is an enlarged fragmentary view showing a portion of FIG. 7.

FIG. 9 is a side view of the protractor head.

FIG. 10 is an axial section taken approximately on the line 10—10 in FIG. 7.

FIG. 11 is an enlarged detailed view of the pulse pickup shown in FIG. 10.

FIG. 12 is an enlarged fragmentary radial section showing a portion of the rotating member of the protractor head.

Figure 1:
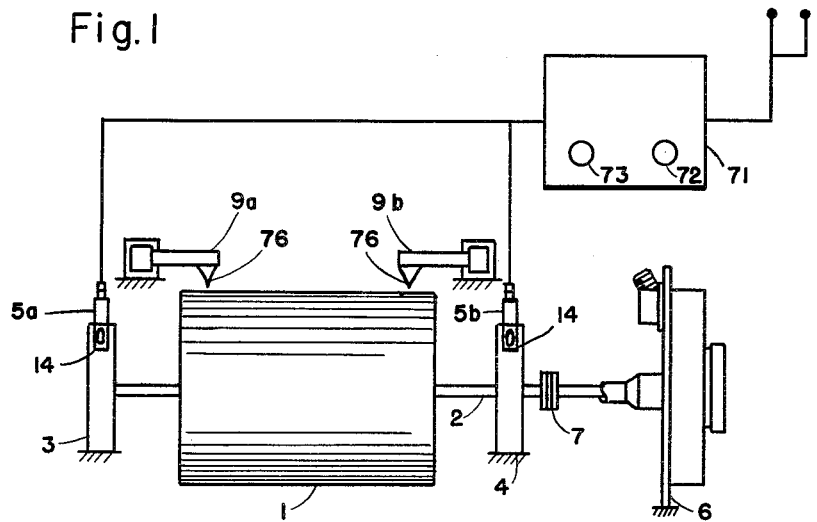
FIG. 1 is a schematic plan view of apparatus in accordance with the invention.

FIG. 1 is a schematic illustration of apparatus in accordance with the invention set up to determine the magnitude and location of unbalance in a rotor 1 having a rotatable shaft 2 supported by bearings 3 and 4. The bearings supporting the rotor may be floating bearings easily movable by forces produced by unbalance of the rotor when rotating. However, the sensitivity of the apparatus in accordance with the invention is such that the rotor may be tested while mounted in its regular bearings.

As illustrated in the drawings (FIGS. 1 and 2), the apparatus in accordance with the invention comprises sensing elements 5a and 5b mechanically connected respectively to the bearings 3 and 4, a protractor head 6 having a rotatable element connected to the shaft 2 by a coupling 7, an oscilloscope 8 and one or more suitably anchored indicators or pointers 9a and 9b.

The sensing element 5a is shown in FIGS. 3 to 6 as comprising a tubular shell or casing 11 joined at one end to a connector housing 12 and at the other end to a base 13 having an apertured projection portion 14. An annular coil 15 wound on a suitable coil form is approximately centered in the shell 11 and is disposed between pole housings 16 and 17 which are formed of magnetically permeable material and are connected by a seal 18. It will be seen that the pole housings are of annular form and that there is a gap between their inner portions. The coil 15 has lead wires 19 that extend out to connector pins 20 in the connector housing 12.

Figure 6:
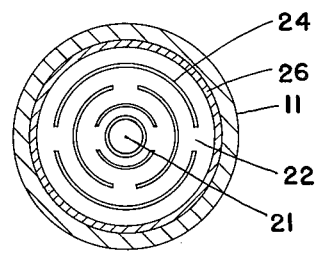
FIG. 6 is an enlarged cross section taken approximately on the line 6—6 in FIG. 5.

An elongated permanent magnet 21 extends coaxially of the coil 15 and is supported for free movement in a lengthwise direction by two diaphragms 22 disposed respectively at opposite ends of the magnet and secured to the ends of a tubular member 23 which connects the two diaphragms and into which the magnet 21 is pressed. The diaphragms 22 are formed of flexible resilient non-magnetic material and are provided with a plurality of arcuate slots 24 as illustrated in FIG. 6 to increase their flexibility. Short cylindrical damping magnets 25 supported by holding plates 26 are disposed coaxial with the magnet 21 and are spaced from the ends of the magnet 21 to provide it with a selected range of movement. The floating magnet 21 and the damping magnet 25 have like poles facing one another so as to exert a repelling force. The other sensing element 5b is of like construction.

As illustrated in FIG. 1 the apertured base portions 14 of the sensing elements 5a and 5b are connected respectively to the bearings 3 and 4 supporting the shaft 2 of the rotor 1. If the rotor is out of balance it will exert radial forces when rotating at high speed. These forces act cyclically on the bearings 3 and 4 and tend to move the bearings in a direction transverse to the axis of the rotor. Such movement, even though it is very small, is transmitted to the respective sensing elements 5a and 5b. Through the connection of the sensing element to the bearing the sensing element is moved bodily in a lengthwise direction. By reason of its inertia, the floating magnet 21 tends to remain stationary. Hence movement of the sensing elements 5a and 5b including the coil 15 produces relative movement between the coil and the magnet 21 and thereby induces in the coil a voltage which is coupled to the connector pins 20 by the leads 19. Excessive relative movement between the coil 15 and the floating magnet 21 is prevented by the damping magnets 25. It will thus be seen that the sensing elements 5a and 5b act as transducers to convert the mechanical movements into corresponding electrical signals. The signals produced are characteristic of the oscillation or vibration of the bearings which in turn is a function of the unbalance of the rotor and the speed of rotation.

The protractor head 6 (FIG. 10) comprises a base plate 30 suitably anchored in a selected angular relation to the pointers 9a and 9b and a bushing 31 extending through a hole in the base plate. A rotor in the form of a disc 32 has a hub portion 33 which is rotatably supported in the bushing 31 by an anti-friction bearing 34. The hub 33 of the rotor is keyed on a flexible shaft 35 which extends through the bushing 31 and a shaft housing 36 and is connected to the shaft 2 (FIG. 1) of the rotating body to be tested by the flexible coupling 7. A soft rubber layer sandwiched between two circular plates may be used for the coupling 7. The disc 32 is formed of non-magnetic material and at one point in its peripheral portion it carries a small iron core or slug 37 (FIG. 12) which may be in the form of a small piece of iron wire. An annular raised portion 38 on the disc 32 carries one or more index marks 39 including a "0" mark.

An outer control dial 40 of larger diameter than the disc 32 and formed, for example, of compressed plastic and fiber composition, is rotatable on the bushing 31 coaxially with the disc 32. The rear face of the dial 40 engages the base plate 30 while the front face is centrally recessed to receive the disc 32. A flat ring 41 (FIG. 8) is mounted on an outer peripheral portion of the dial 40 and carries a protractor scale 42.

The outer dial 40 also carries an electrical pulse pickup 45 (FIG. 11) which is positioned so as to be near the path of travel of the core 37 carried by the disc 32. As shown more clearly in FIG. 11, the pulse pickup comprises an annular coil 46 wound on a suitable coil form and positioned in a recess in the outer peripheral portion of the dial 40 with the axis of the coil radial of the dial. A permanent bar magnet 47 extends diametrically of the coil and is spaced outwardly from the outer end of the coil. Strips 48 of magnetically permeable material extend from opposite ends of the permanent magnet 47 inwardly along opposite sides of the coil and then converge inwardly and join the inner end of a soft iron probe 49 that extends axially of the coil 46. The converging portions of the strips 48 preferably taper inwardly to the width of the probe 49 which is narrower than the side portions of the strips 48. The inner end of the probe 49 is aligned with and closely adjacent the outer periphery of the disc 32 so that the iron core 37 carried by the disc passes in close proximity to the inner end of the probe 49 during each revolution of the disc to generate a voltage pulse in the coil 46 each revolution. The coil winding is connected by suitable leads 51 to slip rings 52 which are pressed into the rear face of the dial 40 and are engaged by brushes 53 connected to leads 54 in a connector housing 55 mounted on the plate 30.

A transparent inner dial 60 carries on its inner face a flanged ring 61 which bears on a peripheral shoulder formed on the dial 40 and is held in place by a snap ring 62 so that the inner dial is coaxial with and rotatable relative to the outer dial 40 by means of a knob 64. The transparent dial 60 is spaced from the recessed portion of the outer dial 40 and the disc 32 is disposed in the space between the two dials. A scale 63 calibrated in degrees is provided on the ring 61 and is visible through the transparent dial. Although inner dial 60 is rotatable relative to the outer dial 40, the frictional engagement between the two dials holds them in the relative position to which they are set.

Figure 2:
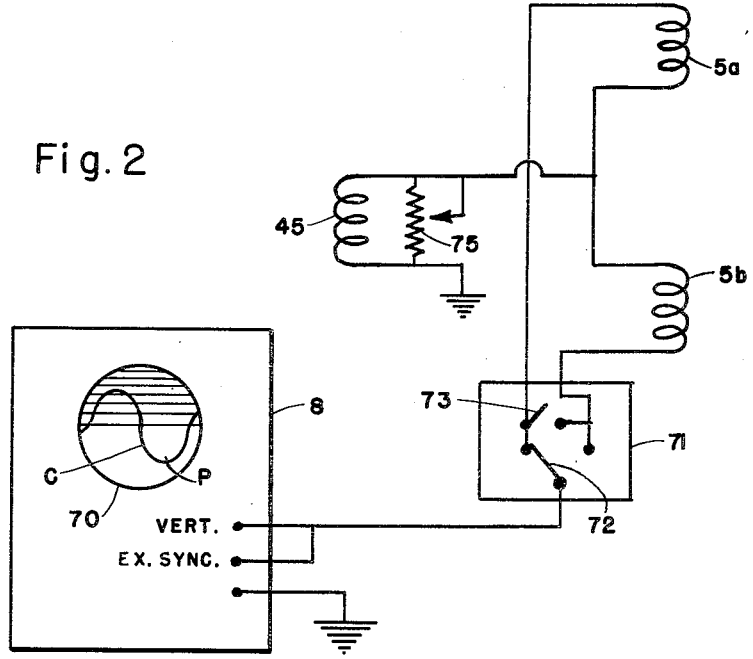
FIG. 2 is a wiring diagram showing electrical connections.
Figure 3:
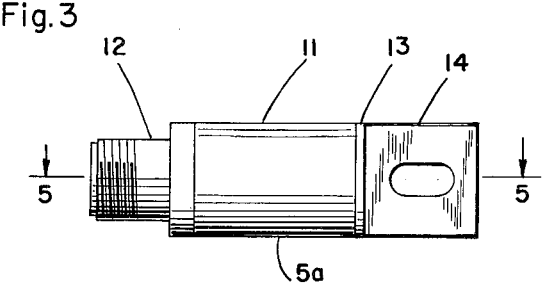
FIG. 3 is a side view of one of the sensing elements of the apparatus.
Figure 4:
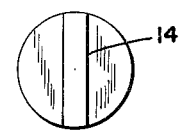
FIG. 4 is an end view of the sensing element.
Figure 5:
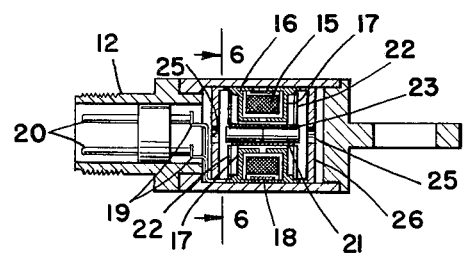
FIG. 5 is a longitudinal section taken approximately on the line 5—5 of FIG. 3.

The oscilloscope 8 (FIG. 2) has a screen 70 that is calibrated to permit reading the amplitude of a curve appearing on the screen. The leads of the sensing elements 5a and 5b and the pulse pickup 45 are connected to the oscilloscope 8 through a control box 71 as illustrated in FIGS. 1 and 2. Switches 72 and 73 in the control box 71 make it possible to connect either or both of the sensing elements 5a and 5b to the vertical deflection circuit of the oscilloscope and also to the external synchronizing circuit. The pulse pickup 45 is also connected to the vertical deflection circuit in series with one or the other or both of the sensing elements 5a and 5b so that the signal of the pulse pickup is superimposed on that of the sensing elements. The pulse pickup is shunted by a variable resistance 75 so as to regulate the relative signal strength of the voltage pulse that is fed to the oscilloscope.

The indicators 9a and 9b are shown as comprising pointers which are normally stationary but preferably adjustable and are suitably supported on a base that supports the bearings 3 and 4. Each of the indicators has a pointer 76 that is adapted to be positioned closely adjacent the periphery of the rotating body 1 that is being tested. Instead of having two separate pointers at opposite ends of the rotor 1, the indicator may comprise a single straight blade extending lengthwise of the rotor and adjacent its periphery.

The apparatus is preferably calibrated by running it with a rotor having a known unbalance. With the apparatus connected as described above, the rotor is rotated at a selected speed by suitable driving means (not shown).

To calibrate the apparatus with respect to a known unbalance at the left hand end of the rotor, as viewed in FIG. 1, switch 72 (FIG. 2) is set in its left hand position and switch 73 is opened so as to connect only the sensing element 5a and the pulse pickup 45 to the vertical reflection circuit of the oscilloscope. The signal generated by the sensing element 5a—by reason of the unbalance at the left hand end of the rotor 1—will produce a curve C on the oscilloscope screen which may be of approximately sinusoidal form as shown. The amplitude of the curve as read by the calibrations on the screen are proportional to the magnitude of the unbalance at a selected speed. As the pulse pickup 45 is connected in series with the sensing element 5a, the signal from the pulse pickup will be superimposed on the signal from the sensing element.

The variable resistance 75 is adjusted so that the signal from the pulse pickup is relatively weak and appears as a small pip P on the curve C. By reason of the small magnitude of the signal from the pulse pickup, synchronization of the oscilloscope is effected by the signal from the sensing element 5a and is not affected by the pulse pickup. The position of the pip P on the curve C depends on the phase relationship between the signal from the sensing element 5a and that from the pulse pickup 45. The phase relationship can be varied by rotating the outer dial 40 relative to the base plate 30 to change the angular position of the pickup 45. It will be seen that if the dial 40 is turned in a direction opposite to the direction of rotation of the disc 32 the pulse will be produced earlier and conversely if the dial is turned in the opposite direction the pulse will be produced later. Hence the position of the pip P on the curve C can be shifted by rotation of the dial 40. The dial is accordingly turned in order to bring the pip to a selected position on the curve C, for example at the center of the lower lobe as illustrated in FIG. 2. The rotor 1 is then stopped and turned manually to position the known unbalance opposite the indicator 9a. With the rotor 1 held in this position and with the outer dial 40 held stationary in the position to which it has been turned, the inner dial 60 is turned by means of the knob 64 to bring the "0" on its scale 63 into register with the "0" mark 39 on the disc 32. The angular relationship between the two dials 40 and 60 which is thus obtained compensates for any lag or phase differential in the operation of the sensing element and also takes into account the selected position of the indicator 9a. This angular relationship is left the same during subsequent tests on "unknown" rotors of the same general character and at the same general speed of rotation as the one used in calibration.

The operation in testing an unknown rotor is similar to the calibration procedure described above. With the rotor rotating at a selected speed, the outer dial 40 is turned so as to bring the pip P to the selected position on the curve C. The inner dial 60 is permitted to turn with the outer dial 40 so that the angular relationship between the two dials remains unchanged. The rotor is then stopped and is turned by hand to a position in which the zero mark 39 on the disc 32—which turns with the rotor—registers with the zero mark on the scale 63 of the inner disc dial 60. With the rotor 1 in this position the indicator 9a or 9b indicates the location of the unbalance. Depending on the calibration of the apparatus, the pointer will indicate either the heavy side or the light side of the rotor as desired. As described above the control switches 72 and 73 make it possible to test each end of the rotor individually or both ends simultaneously. The magnitude of the unbalance is read directly on the screen of the oscilloscope by means of the calibrations provided. As the location and magnitude of the unbalance are thus accurately determined, correction can readily be made to balance the rotor.

While a preferred embodiment of the invention has been shown by way of example in the drawings and particularly described, it will be understood that the invention is not limited to this embodiment and that modifications may be made within the scope of the appended claims.

What I claim and desire to secure by Letters Patent is:

1. An electronic protractor to determine and locate any asymmetry of a body mounted for rotation in bearing means, comprising a base, a rotatable member, means connecting said member to rotate with said body, a manually rotatable but normally stationary dial coaxial with and adjacent said rotatable member, cooperating indices on the rotatable member and the dial to position said member in a selected angular relationship to said dial, an electrical pickup carried by said dial and positioned adjacent to the rotatable member, actuating means carried by said rotatable member and cooperating with said pickup to generate an electrical pulse each time said actuating means passes said pickup, an oscilloscope having a screen, a sweep circuit and a vertical deflection circuit, sensing means responsive to vibrations of the bearing means during rotation of the body to generate signals representative of the asymmetry of the body, means coupling the sensing means to the sweep circuit and the vertical deflection circuit to synchronize the oscilloscope sweep circuit with the rotation of the body and provide on the oscilloscope screen a curve representative of the asymmetry of the body, means coupling said pickup to said vertical deflection circuit to superimpose on said curve a pip representative of said pulses, a selected position of the pip on said curve being provided by manual rotation of said dial relative to said base to change the angular position of the pickup with respect to the rotatable member, and pointer means in a selected angular relation to said base to indicate the position of the asymmetry of the rotating body when it is stopped and turned to bring selected indices on said rotatable member and dial into registration.

2. An electronic protractor according to claim 1 further comprising a second dial which is coaxial with said first mentioned dial and is rotatable relative thereto and means for rotating and retaining said said second dial in a selected rotational position relative to said first dial.

3. An electronic protractor as described in claim 1 in which said sensing means comprises a casing including means for mounting the casing on said bearing means, a coil coaxially mounted in and movable with said casing, an elongated magnet and flexible mounting means for coaxially mounting said magnet in said coil, said magnet being displaceable axially with respect to said coil, damping means mounted adjacent both ends of said elongated magnet for limiting the axial displacement of said magnet with respect to said coil to a selected range, whereby said magnet generates an A.C. voltage in said coil proportional to the magnitude of the relative displacement therebetween and having a frequency proportional to the frequency of vibration of said bearing means.

4. An electronic protractor according to claim 1 in which said pick-up comprises a coil, a permanent magnet extending transversely of said coil adjacent an outer end thereof, a probe of magnetically permeable material extending axially of said coil and projecting beyond the inner end thereof, and strips of magnetically permeable material extending from opposite ends of said magnet inwardly along opposite sides of said coil and converging and meeting the inner end portion of said probe.

5. An electronic protractor to determine and locate any asymmetry of a rotating body, comprising a base, a hub portion projecting from said base, an outer dial rotatably mounted on said hub portion, said dial being rotatable manually and being frictionally held in selected positions to which it is rotated relative to the base, an inner dial coaxial with and rotatably mounted on said outer dial, said inner dial having a portion spaced from the outer dial and being frictionally held in selected position relative to said outer dial, a rotatable disc disposed between said dials, a shaft fixed to said disc and extending through said hub portion, means for coupling said shaft to said rotating body, actuating means carried by the disc, and an electrical pickup mounted on said outer dial adjacent to the path of travel of the actuating means and cooperating with the actuating means to generate an electrical pulse each time the actuating means passes the pickup.

6. In an electric protractor, a base, a dial rotatably mounted on said base, said dial being manually rotatable and being frictionally held in selected positions to which it is rotated, a rotating disc of non-magnetic material rotatably mounted on said base coaxially with and adjacent said dial, a small slug of magnetic material carried eccentrically by said disc, and an electrical pickup carried by said dial and comprising a coil, a permanent magnet extending transversely of said coil adjacent an outer end thereof, a probe of magnetically permeable material extending axially of said coil and projecting beyond the inner end thereof, and strips of magnetically permeable material extending from opposite ends of said magnet along opposite sides of said coil and converging to and meeting with the inner end of said probe, said pickup being mounted on said dial in position with the inner end of said probe adjacent the path of travel of said slug as said disc rotates.

7. An electronic protractor for simultaneously locating the position and magnitude of any unbalance in a rotating body, comprising bearing means rotatably supporting said body, at least one transducer connected with said bearing means and converting into an electrical signal vibrations of said bearing means produced by said unbalance as said body rotates; a protractor head comprising a base, a dial rotatably mounted on said base coaxially with said body, said dial manually rotatable and being frictionally held in any selected position to which it is turned relative to the base, a rotatable member rotatably mounted on said base coaxially with and adjacent said dial, said dial and member having cooperating indices, coupling means connecting said member to said body to rotate together, actuating means carried eccentrically by said member, an electrical pickup carried by said dial in position adjacent the path of travel of said actuating means and cooperating with the actuating means to generate an electrical pulse each time the actuating means passes the pickup, an oscilloscope having a screen, a sweep circuit and a vertical deflection circuit, means coupling said transducer to the sweep circuit and the vertical deflection circuit to synchronize said sweep circuit with the rotation of said body and provide on said oscilloscope screen a curve representative of the unbalance of the body with an amplitude corresponding to the magnitude of the unbalance, means coupling said pulse pickup to said vertical deflection circuit to superimpose on said curve a pip representative of said pulses, a selected position of the pip on said curve being provided by rotation of said dial relative to said base to change the angular position of the pickup with respect to the rotatable member, and pointer means in a selected angular relation to said base to indicate the position of the unbalance of the rotating body when it is stopped and turned to bring selected indices on said rotatable member and dial into registration.

8. Apparatus according to claim 7, in which said bearing means comprises axially spaced bearings, a transducer connected to each of said bearings, further comprising switch means for selectively coupling either or both of said transducers to the vertical deflection circuit of said oscilloscope.

9. Apparatus according to claim 7, further comprising a second dial rotatably mounted on said first mentioned dial coaxial therewith and means for rotating and retaining said second dial in a selected position relative to the first dial.

10. In an electronic protractor that determines and locates asymmetry of a rotating body, a base, a first dial rotatably mounted on the base, the first dial being manually rotatable and frictionally held in selected positions to which it is rotated relative to the base, a second dial rotatably mounted coaxially with the first dial, the second dial being frictionally held in selected positions to which it is rotated relative to the first dial, a rotatable member mounted coaxially with and adjacent to said dials, cooperating indices on the member and the second dial to position said member in a selected angular relationship to the dials, a shaft fixed to said member, means for coupling the shaft to said rotating body, actuating means carried by the rotatable member, and an electrical pickup mounted on said first dial adjacent to the path of travel of the actuating means and cooperating with the actuating means to generate an electrical pulse each time the actuating means passes the pickup.

References Cited in the file of this patent

UNITED STATES PATENTS

| | | |
|---|---|---|
| 2,325,144 | Marsh | July 27, 1943 |
| 2,405,474 | Van Degrift | Aug. 6, 1946 |
| 2,461,645 | Kallmann | Feb. 15, 1949 |

FOREIGN PATENTS

| | | |
|---|---|---|
| 595,906 | Great Britain | Dec. 23, 1947 |
| 686,272 | Great Britain | Jan. 21, 1953 |